(12) United States Patent
Park et al.

(10) Patent No.: US 11,248,671 B2
(45) Date of Patent: Feb. 15, 2022

(54) BRAKE DISC AND MANUFACTURING METHOD THEREFOR

(71) Applicants: RESEARCH INSTITUTE OF INDUSTRIAL SCIENCE & TECHNOLOGY, Pohang-si (KR); POSCO, Pohang-si (KR)

(72) Inventors: Kwang Soo Park, Ulsan (KR); Sook Hwan Kim, Pohang-si (KR)

(73) Assignees: RESEARCH INSTITUTE OF INDUSTRIAL SCIENCE & TECHNOLOGY, Gyeongsangbuk-Do (KR); POSCO, Gyeongsangbuk-Do (KR)

( * ) Notice: Subject to any disclaimer, the term of this patent is extended or adjusted under 35 U.S.C. 154(b) by 83 days.

(21) Appl. No.: 16/472,019

(22) PCT Filed: Dec. 13, 2017

(86) PCT No.: PCT/KR2017/014623
§ 371 (c)(1),
(2) Date: Jun. 20, 2019

(87) PCT Pub. No.: WO2018/117528
PCT Pub. Date: Jun. 28, 2018

(65) Prior Publication Data
US 2020/0116222 A1    Apr. 16, 2020

(30) Foreign Application Priority Data

Dec. 22, 2016  (KR) .................. 10-2016-0176830
Dec. 22, 2016  (KR) .................. 10-2016-0176831
Dec. 22, 2016  (KR) .................. 10-2016-0176904

(51) Int. Cl.
*F16D 65/12*       (2006.01)
*F16D 65/02*       (2006.01)

(52) U.S. Cl.
CPC ......... *F16D 65/123* (2013.01); *F16D 65/125* (2013.01); *F16D 65/126* (2013.01);
(Continued)

(58) Field of Classification Search
CPC ...... F16D 65/12; F16D 65/123; F16D 65/125; F16D 65/126; F16D 65/128; B21D 22/14; B21D 22/16
(Continued)

(56) References Cited

U.S. PATENT DOCUMENTS 4,741,194 A * 5/1988 Kozyra .................. B23P 9/00
                                                              188/218 XL
5,988,324 A * 11/1999 Bertetti ............... B60B 27/0005
                                                                  188/18 A
(Continued)

FOREIGN PATENT DOCUMENTS

CN          1354272        6/2002
CN          1385628        12/2002
(Continued)

OTHER PUBLICATIONS

International Search Report—PCT/KR2017/014623 dated May 29, 2018.
(Continued)

*Primary Examiner* — Christopher P Schwartz
(74) *Attorney, Agent, or Firm* — Cantor Colburn LLP

(57) ABSTRACT

In order to achieve lightness and improve hardness of a brake disk, and minimize weight and improve productivity through an improvement of a coupling structure of a disk plate and a hub, provided is a method of manufacturing a brake disk including a disk plate, which provides a friction surface and is formed with a hole at a center, and a hub, which is coupled to the hole formed at the center of the disk plate, the method including: preparing a disk plate; prepar-
(Continued)

ing a hub in the form of a flat plate; positioning the hub in the form of the flat plate on one surface of the disk plate; and bonding the disk plate and the hub by an interference fit.

5 Claims, 7 Drawing Sheets

(52) U.S. Cl.
CPC .... *F16D 65/128* (2013.01); *F16D 2065/1304* (2013.01); *F16D 2065/1344* (2013.01); *F16D 2200/0021* (2013.01); *F16D 2200/0052* (2013.01); *F16D 2250/0061* (2013.01)

(58) Field of Classification Search
USPC .................................. 188/218 XL, 17, 18 A
See application file for complete search history.

(56) References Cited

U.S. PATENT DOCUMENTS

| | | | | |
|---|---|---|---|---|
| 6,243,949 | B1* | 6/2001 | Dickerson | B21H 1/02 |
| | | | | 188/218 XL |
| 6,357,557 | B1* | 3/2002 | Di Ponio | F16D 65/12 |
| | | | | 164/111 |
| 6,450,303 | B1* | 9/2002 | Keck | F16D 65/126 |
| | | | | 188/218 XL |
| 6,531,011 | B2* | 3/2003 | Gross | C04B 35/573 |
| | | | | 156/293 |
| 7,823,763 | B2* | 11/2010 | Sachdev | B23K 20/12 |
| | | | | 228/112.1 |
| 9,051,632 | B2* | 6/2015 | Kim | C22C 21/08 |
| 10,072,718 | B2* | 9/2018 | Deriaz | B21H 5/00 |
| 2004/0134740 | A1* | 7/2004 | Gerathewohl | F16D 13/683 |
| | | | | 192/70.2 |
| 2011/0240422 | A1* | 10/2011 | Lathwesen | F16D 65/123 |
| | | | | 188/218 XL |
| 2012/0085603 | A1* | 4/2012 | Mayer | F16D 65/123 |
| | | | | 188/218 XL |
| 2016/0160948 | A1* | 6/2016 | Wagner | F16D 65/123 |
| | | | | 188/218 XL |
| 2018/0094680 | A1* | 4/2018 | Nakatsuji | F16D 65/12 |
| 2018/0283480 | A1* | 10/2018 | Park | C22C 38/04 |
| 2018/0372174 | A1* | 12/2018 | Deriaz | F16D 65/123 |

FOREIGN PATENT DOCUMENTS

| | | |
|---|---|---|
| CN | 1421980 | 6/2003 |
| CN | 101282795 | 10/2008 |
| CN | 102245922 | 11/2011 |
| CN | 103307150 | 9/2013 |
| CN | 104947030 | 9/2015 |
| CN | 105026597 | 11/2015 |
| CN | 105041921 | 11/2015 |
| DE | 19830666 | 1/2000 |
| DE | 10206567 | 9/2003 |
| EP | 1201957 | 7/2007 |
| GB | 893323 | 4/1962 |
| GB | 2204592 | 11/1988 |
| JP | S60052559 | 3/1985 |
| JP | S63030617 | 2/1988 |
| JP | H03033521 | 2/1991 |
| JP | 2007198481 | 8/2007 |
| JP | 2012519806 | 8/2012 |
| JP | 2013189195 | 9/2013 |
| JP | 2013244521 | 12/2013 |
| JP | 2014156931 | 8/2014 |
| JP | 2016512288 | 4/2016 |
| KR | 20000068647 | 11/2000 |
| KR | 20070013387 | 1/2007 |
| KR | 20090053538 | 5/2009 |
| KR | 20130050001 | 5/2013 |
| KR | 20130108899 | 10/2013 |
| KR | 20150079161 | 7/2015 |
| KR | 101576425 | 12/2015 |
| KR | 101585444 | 1/2016 |
| KR | 101594702 | 2/2016 |
| KR | 20160078805 | 7/2016 |

OTHER PUBLICATIONS

Chinese Office Action—Chinese Application No. 201780079534.X dated Jul. 13, 2020, citing CN 103307150, CN 1421980, CN 105041921, CN 101282795, CN 102245922, CN 104947030, GB 893323, and U.S. Pat. No. 4,741,194.

Japanese Office Action—Japanese Application No. 2019-534717 dated Jul. 7, 2020, citing JP 2014-156931, DE 19830666, JP 2016-512288, KR 10-2016-0078805, DE 10206567, JP 2012-519806, and JP H3-33521.

Chinese Notice of Allowance—Chinese Application No. 201780079534.X dated Feb. 9, 2021, citing CN 105026597, JP S63-30617, JP S60-52559, GB 2204592, CN 1354272, and CN 1385628.

Japanese Office Action—Japanese Application No. 2019-534717 dated Jan. 12, 2021, citing JP 2014-156931, DE 19830666, JP 2016-512288, KR 2016-0078805, KR 10-1594702, KR 10-1585444, DE 10206567, JP 2012-519806, and JP H03-33521.

* cited by examiner

FIG. 7
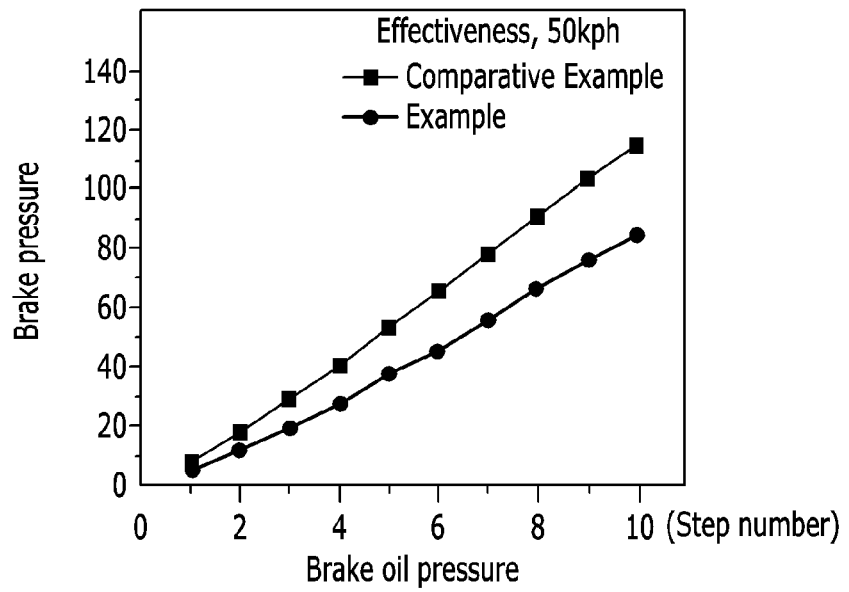
(a)
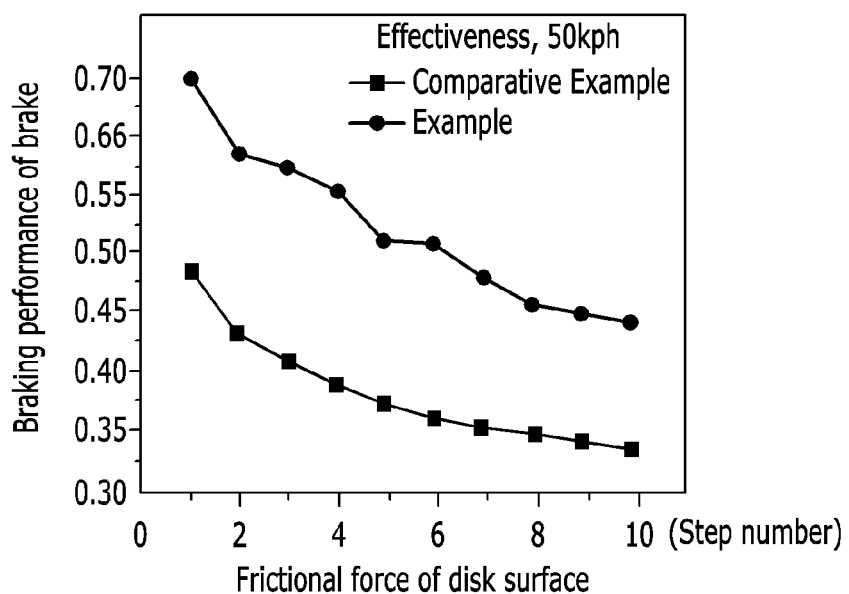
(b)

BRAKE DISC AND MANUFACTURING METHOD THEREFOR

TECHNICAL FIELD

The present invention relates to a brake disk of a vehicle and a method of manufacturing the same.

BACKGROUND ART

In general, a brake device of a vehicle is a device used for decelerating or stopping a travelling vehicle.

A brake disk used in the brake device emits kinetic energy of a vehicle as thermal energy by using frictional force generated through friction with a pressurizing pad that is a friction member to brake the vehicle.

The brake disk includes a disk plate formed in a ring or a drum providing a friction surface, and a hub bonded to the disk plate to couple the disk plate to an axle.

The brake disk requires low weight for improving fuel efficiency of a vehicle, and needs to be light, have high strength, and have heat resistance, wear resistance, and durability.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a brake disk which has low weight and has improved hardness, and a method of manufacturing the same.

The present invention has also been made in an effort to provide a brake disk which uses high-manganese steel and has minimized weight and improved coupling force through an improvement of a coupling structure between a disk plate and a hub, and a method of manufacturing the same.

The present invention has also been made in an effort to provide a brake disk which more simply and easily couples a disk plate and a hub to improve productivity and decrease manufacturing cost, and a method of manufacturing the same.

Technical Solution

An exemplary embodiment of the present invention provides a method of manufacturing a brake disk including a disk plate, which provides a friction surface and is formed with a hole at a center, and a hub, which is coupled to the hole formed at the center of the disk plate, the method including: preparing a disk plate; preparing a hub; and bonding the hub to the disk plate by an interference fit.

The bonding may include bonding the hub to the disk plate by hot stamping the hub to the disk plate.

The bonding of the hub to the disk plate by hot stamping the hub to the disk plate may include disposing the disk plate within a molding machine, heating the hub at a high temperature, positioning the heated hub in the disk plate, pressurizing and molding the hub so that the hub is bonded to the hole of the disk plate and bonding the hub to the disk plate by the interference fit, and quenching the hub.

The bonding may include bonding the hub to the disk plate by cold stamping the hub to the disk plate.

The bonding of the hub to the disk plate by cold stamping the hub to the disk plate may include disposing the assembled disk plate and hub within a molding machine, and pressurizing the hub to the hole of the disk plate and bonding the hub to the disk plate by the interference fit at a room temperature.

The bonding may include bonding the hub to the disk plate by hydroforming the hub to the disk plate.

The bonding of the hub to the disk plate by hydroforming the hub to the disk plate may include disposing the assembled disk plate and hub within a molding machine, and pressurizing the hub to the hole of the disk plate by applying hydraulic pressure to the hub and bonding the hub to the disk plate by the interference fit.

The disk plate may be formed of high-manganese steel in which manganese (Mn) is 16 to 20 wt % or more.

The disk plate may include carbon (C) of 0.9 to 1.31 wt %, manganese (Mn) of 16 to 20 wt %, silicon (Si) of 0.01 to 0.03 wt %, chrome (Cr) of 2.2 to 2.8 wt %, and copper (Cu) of 0.3 to 0.7 wt %, and the remainder may include Fe and other inevitable impurities.

The hub may be formed of the same material as that of the disk plate.

The hub may be formed of a different material from that of the disk plate.

The hub may be formed of a boron steel material.

The hub may be formed of a steel material of a general structure that is a different material from that of the disk plate.

The preparing of the disk plate may further include processing a hole in the form of an unevenness at the center of the disk plate.

The preparing of the hub may further include processing a bonded portion of the hub that is in contact with an inner peripheral surface of the hole to have a form corresponding to the hole of the disk plate.

In the bonding of the hub to the disk plate by hot stamping the hub to the disk plate, the hub may be heated at a temperature of 900° C. to 950° C.

In the bonding of the hub to the disk plate by hot stamping the hub to the disk plate, applied pressure to the hub may be 12 to 22 KN/cm$^2$.

In the bonding of the hub to the disk plate by cold stamping the hub to the disk plate, applied pressure to the hub may be 40 to 64 KN/cm$^2$.

In the bonding of the hub to the disk plate by hydroforming the hub to the disk plate, applied pressure to the hub may be 60 to 100 KN/cm$^2$.

Another exemplary embodiment of the present invention provides a brake disk, including a disk plate, which provides a friction surface and is formed with a hole at a center, and a hub, which is coupled to the hole formed at the center of the disk plate, in which the hub is bonded to the disk plate by an interference fit.

The hub may be hot stamped to the disk plate and be bonded to the disk plate.

The hub may be cold stamped to the disk plate and be bonded to the disk plate.

The hub may be hydroformed to the disk plate and be bonded to the disk plate.

The disk plate and the hub may be heterogeneous materials.

The disk plate may be formed of high-manganese steel in which manganese (Mn) is 16 to 20 wt % or more.

The disk plate may include carbon (C) of 0.9 to 1.31 wt %, manganese (Mn) of 16 to 20 wt %, silicon (Si) of 0.01 to 0.03 wt %, chrome (Cr) of 2.2 to 2.8 wt %, and copper (Cu) of 0.3 to 0.7 wt %, and the remainder may include Fe and other inevitable impurities.

The hub may be formed of a boron steel material.

The hub may be formed of the same material as that of the disk plate.

The hub may be formed of a steel material of a general structure that is a different material from that of the disk plate.

The hole may be formed in the form of an unevenness.

A surface of the hub that is in contact with the hole may be formed in a form corresponding to the unevenness form of the hole.

The disk plate may be further formed with a cooling hole on a surface.

The disk plate may have a solid structure in a form of a single plate material.

Advantageous Effect

As described above, according to the present implementation example, the disk plate is formed of a high-manganese steel material to have a decreased thickness, so that it is possible to sufficiently secure hardness and decrease weight of the disk plate by 30% or more compared to the related art.

In addition, the disk plate and the hub are pressurized through the hot stamping process, the cold stamping process, or the hydroforming process and are bonded by the interference fit, so that it is not necessary to add a separate configuration for connecting the two members, thereby minimizing weight of the brake disk.

In addition, it is possible to simplify a production process to improve productivity of the brake disk, and improve competitiveness of the brake disk by lower cost.

In addition, it is possible to improve bonding force between the disk plate and the hub, and improve hardness of the hub.

In addition, even though the disk is manufactured in a solid type, not a vented type having cooling holes, it is possible to prevent the generation of a hot deformation problem. Accordingly, it is possible to manufacture a front wheel brake of an existing produced vehicle type in the solid type that is the form of a rear wheel brake and apply the front wheel brake.

DESCRIPTION OF THE DRAWINGS

FIG. 7 is a graph illustrating a result of a comparison experiment between the brake disk manufactured according to the exemplary embodiment of the present invention and a brake disk in the related art.

MODE FOR INVENTION

Figure 1:
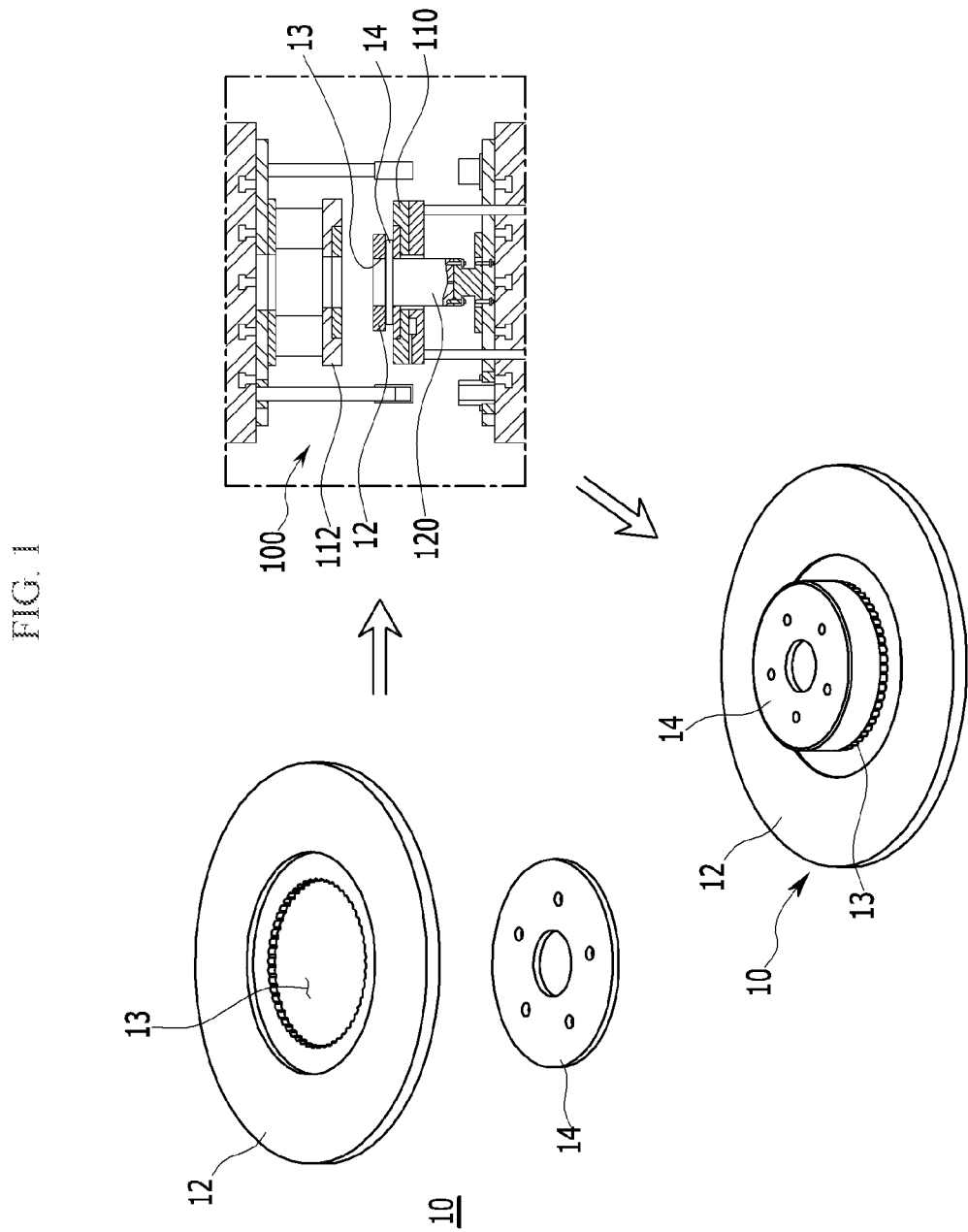
FIGS. 1 to 3 are diagrams schematically illustrating a process of manufacturing a brake disk according to exemplary embodiments of the present invention.

Hereinafter, the exemplary embodiment of the present invention will be described so that those skilled in the art can easily carry out the present invention with reference to the accompanying drawings. As those skilled in the art can easily understand the present invention, the exemplary embodiment to be described below may be modified to various forms within the limit without departing from the concept and the range of the present invention. Like reference numerals designate like elements throughout the specification.

All the terminologies including technical terms and scientific terms used herein have the same meanings that those skilled in the art generally understand. Terms defined in dictionaries are construed to have meanings corresponding to related technical documents and the present description, and they are not construed as ideal or very official meanings, if not defined.

FIG. 1 is a diagram schematically illustrating a process of manufacturing a brake disk according to the present exemplary embodiment.

As illustrated in FIG. 1, a process of manufacturing a brake disk 10 according to the present exemplary embodiment includes preparing a disk plate 12 providing a friction surface and a hub 14 coupled to the disk plate, and hot stamping the hub to the prepared disk plate and bonding the hub by an interference fit.

The disk plate 12 is a circular plate structure providing the friction surface, and is formed with a hole 13 at a center so as to be coupled with the hub 14 to form a ring shape. The hole 13 formed at the center of the disk plate may be processed in the form of an evenness in which prominences and depressions are repeatedly formed along an inner peripheral surface. The hole has the unevenness form, so that coupling force with the hub is improved.

The disk plate 12 may be formed of high-manganese steel in which manganese (Mn) is 16 to 20 wt % or more.

As described above, the disk plate providing the friction surface for braking is formed of high-manganese steel having excellent braking performance and wear resistance and little thermal deformation, thereby improving toughness, impact resistance, and hot deformation resistance together with brake disk braking performance and wear resistance.

In the present exemplary embodiment, the disk plate 12 may include carbon (C) of 0.9 to 1.31 wt %, manganese (Mn) of 16 to 20 wt %, silicon (Si) of 0.01 to 0.03 wt %, chrome (Cr) of 2.2 to 2.8 wt %, and copper (Cu) of 0.3 to 0.7 wt %, and the remainder may include Fe and other inevitable impurities.

As a result of many experiments, the brake disk including the disk plate formed of high-manganese steel of the present exemplary embodiment has a larger coefficient of friction and higher thermal conduction than those of a brake disk including a disk plate formed of general carbon steel, so that it can be seen that both braking performance and heat radiation performance are improved.

The hub 14 is a structure which is coupled to the disk plate 12 to couple the disk plate to an axle of a vehicle body. The hub 14 may be formed of a material different from that of the disk plate 12. The hub may be formed of a material having excellent moldability at a high temperature and having hardness after cooling for hot stamping. In the present exemplary embodiment, the hub may be formed of boron steel. In addition to boron steel, the hub may be formed of various materials as long as the hub is bonded to the disk plate by hot stamping.

In the present exemplary embodiment, the hub 14 is prepared in a circular flat plate form. Otherwise, the hub may be prepared by pressing a circular plate with a press and pre-forming the circular plate in a desired form.

The hub 14 formed in the flat plate is bonded to the hole of the disk plate 12 by an interference fit through the hot stamping process.

The hot stamping means a process of molding a material in a high-temperature state with a press and rapidly cooling the material to manufacture a product, and in the present exemplary embodiment, the hub is heated and molded to a high temperature state and is rapidly cooled to the disk plate and is bonded to the disk plate in an interference fit structure.

In the present exemplary embodiment, the bonding of the hub to the disk plate by hot stamping includes disposing the disk plate within a molding machine, heating the hub at a high temperature, positioning the heated hub to the disk plate, pressurizing the hub so that the hub is bonded to the hold of the disk plate and bonding the hub to the disk plate by an interference fit, and rapidly cooling the hub.

Accordingly, the hub is bonded to the hole of the disk plate by the interference fit through the hot stamping process. For example, the prepared hub is heated to a high-temperature state through a heating furnace, the heated hub is moved to a mold of the molding machine in which the disk plate is disposed, and the hub is pressed by a punch of the molding machine, is in close contact with and bonded to the hole of the disk plate with high pressure, and then is rapidly cooled.

That is, as illustrated in FIG. 1, the disk plate 12 and the hub 14 heated to a high temperature are disposed on an upper die 112 and a lower die 110 of the molding machine 100 for hot stamping and the hub 14 is pressurized by a punch 120. The hub is in close contact with the disk plate while being plastic-deformed by the punch.

Figure 3:
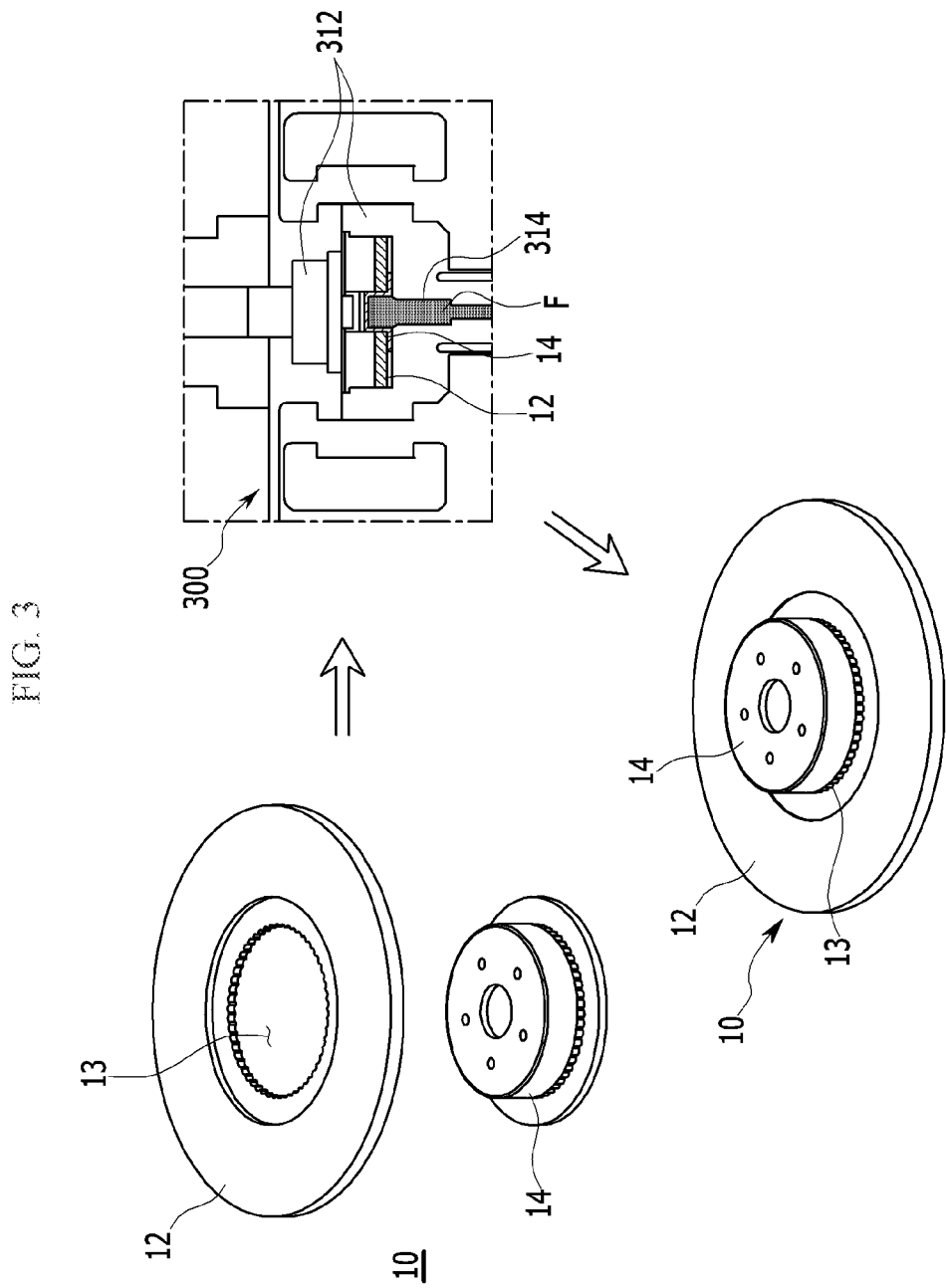
Figure 4:
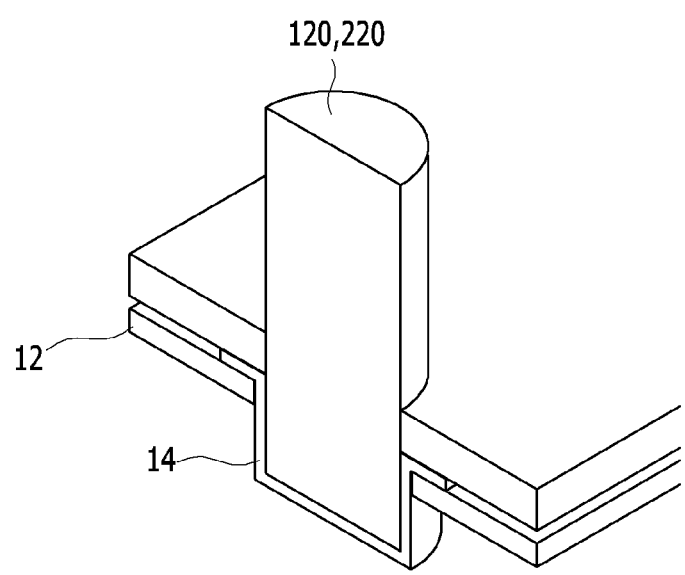
FIG. 4 is a schematic diagram for describing a hot stamping process or a cold stamping process of the brake disk according to the exemplary embodiment of the present invention.

Accordingly, as illustrated in FIG. 3, the hub 14 is pressurized by the punch 120 and is molded to be in close contact with an inner peripheral surface of the hole 13 of the disk plate 12 by the interference fit. The plastic-deformed hub is rapidly cooled through the dies of the molding machine and the disk plate that is in contact with the hub. The hub is pressurized through the hot stamping process and a bonded surface of the hub with respect to the hole is molded in the form of a closed cross-section of the hole of the disk plate, so that the hub is strongly in close contact with and is bonded to the hole.

In the present exemplary embodiment, when the hub is bonded to the disk plate by hot stamping the hub, the hub may be heated at a temperature of 900° C. to 950° C.

When the temperature of heating the hub during the hot stamping and bonding process gets out of the range, the amount of plastic deformation of the material increases, so that there are increasing concerns in the generation of deformation.

During the process of bonding the hub to the disk plate by hot stamping the hub, applied pressure to the hub may be 12 to 22 KN/cm².

During the hot stamping and bonding process, when the molding progresses while the material is cooled from the heating temperature of the hub, appropriate applied pressure by softening the material may be 12 to 22 KN/cm². When the applied pressure gets out of the range, the amount of plastic deformation of the material increases, so that there are increasing concerns in the generation of deformation.

As described above, the hub formed of boron steel is bonded to the disk plate formed of high-manganese steel by hot stamping, so that it is possible to rapidly and strongly bond the hub to the disk plate without using a separate apparatus, such as a rivet or a bolt, for fastening, and improve lightness of the brake disk. Further, the hub may be more simply coupled to the disk plate, thereby manufacturing the brake disk with high productivity and low cost.

Further, the hub bonded to the disk plate goes through the hot stamping process, so that a heat treatment effect is applied to the hub, thereby improving hardness of the hub.

Herein, the hole 13 of the disk plate 12 is formed in the form of the unevenness, and during the process of molding the hub 14, an outer peripheral surface of the hub passing through the hole is plastic-deformed in the form corresponding to the form of the unevenness of the hole formed at the center of the disk plate. Accordingly, the hole 13 of the disk plate and a lateral surface of the molded hub 14 are engaged with each other in the form of the unevenness, thereby further improving coupling force thereof.

Figure 2:
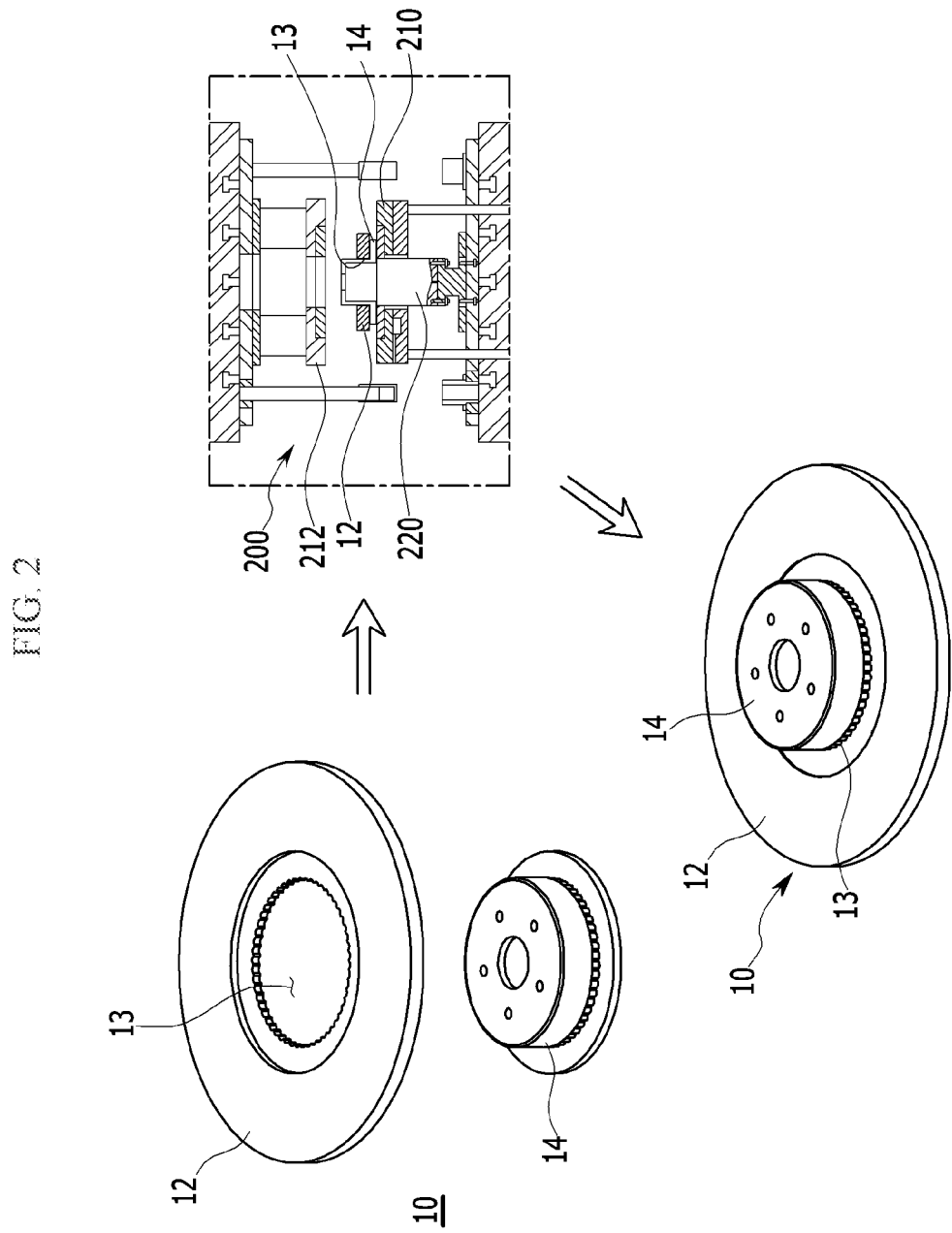

FIG. 2 is a diagram schematically illustrating a process of manufacturing a brake disk according to another exemplary embodiment.

As illustrated in FIG. 2, a process of manufacturing a brake disk 10 according to the present exemplary embodiment includes preparing a disk plate 12 providing a friction surface and a hub 14 coupled to the disk plate, and cold stamping the hub to the prepared disk plate and bonding the hub by an interference fit.

The disk plate 12 is the same as that described above, so that a detailed description thereof will be omitted below.

The hub 14 is a structure which is coupled to the disk plate 12 to couple the disk plate to an axle of a vehicle body. In the present exemplary embodiment, the hub may be formed of the same material as that of the disk plate. In contrast, the hub 14 may be formed of a material different from that of the disk plate 12. In addition to high-manganese steel, the hub may be formed of various materials as long as the hub is bonded to the disk plate by cold stamping. For example, the hub may be formed of a steel material for a general structure.

In the present exemplary embodiment, the hub 14 may be prepared by pressing a circular plate with a press and pre-forming the circular plate in a desired form. Otherwise, the hub may be prepared in the form of a circular flat plate and molded to a desired form at the time of the cold stamping.

The prepared hub 14 is bonded to the hole of the disk plate 12 by an interference fit through the cold stamping process.

The cold stamping means a process of pressing a material in a room temperature state and plastic-working the material to a desired form, and in the present exemplary embodiment, the hub is cold stamped to the disk plate and is bonded to the hole of the disk plate in an interference fit structure while being pressurized and deformed to the external side.

In the present exemplary embodiment, the bonding of the hub to the disk plate by the cold stamping may include disposing the assembled disk plate and hub within the molding machine, and pressurizing and molding the hub so that the hub is bonded to the hole of the disk plate by the interference fit at a room temperature. Herein, the assembling of the disk plate and the hub may mean making the disk plate and the hub be in contact with each other based on the centers of the disk plate and the hub, or coupling the disk plate and the hub by fitting a center portion of the protruding hub to the hole of the disk plate.

Accordingly, the hub is bonded to the hole of the disk plate by the interference fit while being pressurized to the hole of the disk plate through the cold stamping process.

That is, as illustrated in FIG. 2, the disk plate 12 and the hub 14 in the room temperature state are disposed on an upper die 212 and a lower die 210 of a molding machine 200 for cold stamping and the hub 14 is pressurized by a punch 220. The hub is plastic-deformed by applied pressure of the punch. Accordingly, the hub 14 is plastic-deformed by the punch 220 and a coupled surface of the hub 14 is in close contact with an inner peripheral surface of the hole 13 of the disk plate 12.

Accordingly, as illustrated in FIG. 3, the hub 14 is pressurized by the punch 220 and is molded to be in close contact with the inner peripheral surface of the hole 13 of the disk plate 12 by the interference fit. Accordingly, the hub and the disk plate are firmly bonded through the cold stamping.

The hub is pressurized through the cold stamping process and the bonded surface of the hub with respect to the hole is molded in the form of a closed cross-section of the hole of the disk plate, so that the hub is strongly in close contact with and is bonded to the hole. As described above, the hub is bonded to the disk plate by the cold stamping, so that it is possible to plastic-deform the hub so as to maximally maintain hardness of the bonded portion. The room temperature means an atmospheric condition temperature, and may be understood as a temperature of about 25° C.

During the process of bonding the hub to the disk plate by cold stamping the hub, applied pressure to the hub may be 40 to 64 KN/cm². In the case of the cold stamping, molding progresses as a concept of deep drawing, and when a molding load is considered, the amount of plastic deformation of the material increases when the applied pressure gets out of the range, so that there are high concerns in generating deformation.

The hub is formed of high-manganese steel, and thus tensile strength of the hub is 1100 Mpa or more and an elongation percentage of the hub is 45% or more, so that even when the hub is mold by cold stamping the hub, the hub is not fractured. Further, even though the hub is coupled to the hole of the disk plate by the interference fit, the hub may be bonded at optimum hardness due to excellent tensile strength. Accordingly, in the present exemplary embodiment, the hub, which has a thickness of 1.5 to 3 mm and is formed of high-manganese steel, is molded by cold stamping the hub, so that it is possible to simply and strongly couple the hub to the hole of the disk plate.

As described above, the hub may be more simply coupled to the disk plate, thereby manufacturing the brake disk with high productivity and low cost.

In addition, the hub is bonded to the disk plate formed of high-manganese steel by cold stamping, so that it is possible to rapidly and strongly bond the hub to the disk plate without using a separate apparatus, such as a rivet or a bolt, for fastening, and improve lightness of the brake disk.

Herein, the hole 13 of the disk plate 12 is formed in the form of an unevenness, and during the process of molding the hub 14, an outer peripheral surface of the hub passing through the hole is plastic-deformed in the form corresponding to the form of the unevenness of the hole formed at the center of the disk plate. Accordingly, the hole 13 of the disk plate and a lateral surface of the molded hub 14 are engaged with each other in the form of the unevenness, thereby further improving coupling force thereof.

FIG. 3 is a diagram schematically illustrating a process of manufacturing a brake disk according to another exemplary embodiment.

As illustrated in FIG. 3, a process of manufacturing a brake disk 10 according to the present exemplary embodiment includes preparing a disk plate 12 providing a friction surface and a hub 14 coupled to the disk plate, and hydroforming the hub to the prepared disk plate and bonding the hub by an interference fit.

The disk plate 12 is the same as that described above, so that a detailed description thereof will be omitted below.

The hub 14 is a structure which is coupled to the disk plate 12 to couple the disk plate to an axle of a vehicle body. In the present exemplary embodiment, the hub may be formed of the same material as that of the disk plate. In contrast, the hub 14 may be formed of a material different from that of the disk plate 12. In addition to high-manganese steel, the hub may be formed of various materials as long as the hub is bonded to the disk plate by hydroforming. For example, the hub may be formed of a steel material for a general structure.

In the present exemplary embodiment, the hub 14 may be prepared by pressing a circular plate with a press and pre-forming the circular plate in a desired form. Otherwise, the hub may be prepared in the form of a circular flat plate and molded to a desired form at the time of the hydroforming.

The prepared hub 14 is bonded to the hole of the disk plate 12 by an interference fit through the hydroforming process.

The hydroforming means a process of putting a press on an external side of a material and pushing a liquid with high pressure inside the material to plastic work the material to a desired form, and in the present exemplary embodiment, the hub is hydroformed to the disk plate and is bonded to the hole of the disk plate in an interference fit structure while being pressurized and deformed to the external side.

In the present exemplary embodiment, the bonding of the hub to the disk plate by the hydroforming may include disposing the assembled disk plate and hub within a molding machine, and applying hydraulic pressure to the hub and pressurizing the hub to the hole of the disk plate to bond the hub by the interference fit. Herein, the assembling of the disk plate and the hub may mean making the disk plate and the hub be in contact with each other based on the centers of the disk plate and the hub, or coupling the disk plate and the hub by fitting a center portion of the protruding hub to the hole of the disk plate.

Accordingly, the hub is bonded to the hole of the disk plate by the interference fit while a bonded surface of the hub is pressurized to the hole of the disk plate through the hydroforming process.

That is, as illustrated in FIG. 3, the prepared hub is seated inside a mold 312 of a molding machine 300 in the state where a protruding center portion of the hub is fitted to and assembled with the hole of the disk plate. An accommodating hole 314 in which a liquid for applying hydraulic pressure to the hub is accommodated is formed in the mold 312, so that when a fluid F filled in the accommodation hole 314 is pushed at high pressure in the state where the hub and the disk plate are seated inside the mold, the hub is pressurized and is pushed to the outside to be bonded to the hole of the disk plate.

Accordingly, the hub 14 is pressurized by hydraulic pressure and is molded so that the bonded surface of the hub is in close contact with an inner peripheral surface of the hole 13 of the disk plate 12 by the interference fit. By maximally using pressure pushing the hub to the outside of the mold that is an advantage of the hydroforming through the hydroforming process, it is possible to form the hub in the form of a closed cross-section of the hole of the disk plate by pressurizing the hub to the outside. The pressurized hub is strongly in contact with and is bonded to the hole while being molded in the form of the close cross-section of the hole of the disk plate. Accordingly, the hub is bonded to the disk plate by hydroforming, so that it is possible to plastic-deform the hub so as to maintain maximum hardness of a bonded portion.

During the process of bonding the hub to the disk plate by hydroforming the hub, applied pressure to the hub may be 60 to 100 KN/cm². When the pressure is expressed by pressure applied into the disk per unit area, the disk having an internal diameter of 150 mm and a height of 8 mm has a cross-section area of 3,600 mm², so that when force of equipment applied is a minimum of 60 KN, pressure is calculated as 100 MPa. As described above, the pressure is derived by the pressure applied per unit area, the hub may be bonded at force of 60 KN to 100 KN, and when the applied pressure gets out of the range, the amount of plastic deformation of the material increases, so that there are high concerns in the generation of deformation.

When the hub is formed of high-manganese steel, tensile strength of the hub is 1100 Mpa or more and an elongation percentage of the hub is 45% or more, so that even when the hub is molded by hydroforming, the hub is not fractured. Further, even though the hub is coupled to the hole of the disk plate by the interference fit, the hub may be bonded at optimum hardness due to excellent tensile strength. Accordingly, in the present exemplary embodiment, the hub, which has a thickness of 1.5 to 3 mm and is formed of high-manganese steel, is molded by hydroforming the hub, so that it is possible to simply and strongly couple the hub to the hole of the disk plate.

As described above, the hub may be more simply coupled to the disk plate, thereby manufacturing the brake disk with high productivity and low cost.

In addition, the hub is bonded to the disk plate formed of high-manganese steel by hydroforming, so that it is possible to rapidly and strongly bond the hub to the disk plate without using a separate apparatus, such as a rivet or a bolt, for fastening, and improve lightness of the brake disk.

Herein, the hole 13 of the disk plate 12 is formed in the form of an unevenness, and during the process of molding the hub 14, an outer peripheral surface of the hub passing through the hole is plastic-deformed in the form corresponding to the form of the unevenness of the hole formed at the center of the disk plate. Accordingly, the hole 13 of the disk plate and a lateral surface of the molded hub 14 are engaged with each other in the form of the unevenness, thereby further improving coupling force thereof.

Figure 5:
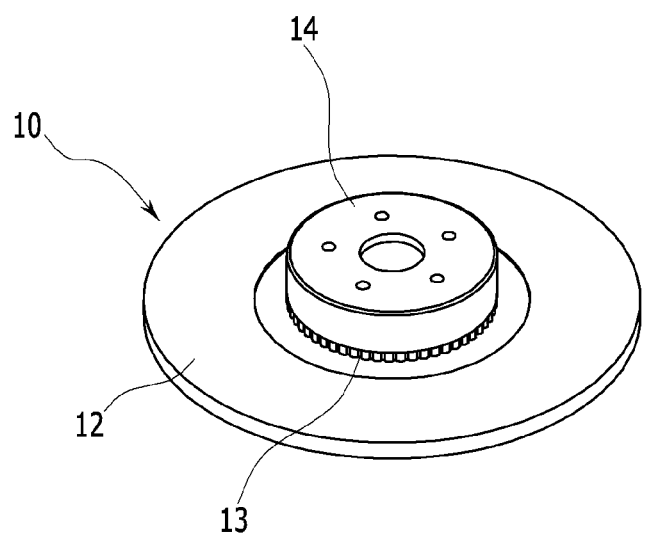
FIG. 5 is a diagram illustrating the brake disk manufactured according to the exemplary embodiment of the present invention.
Figure 6:
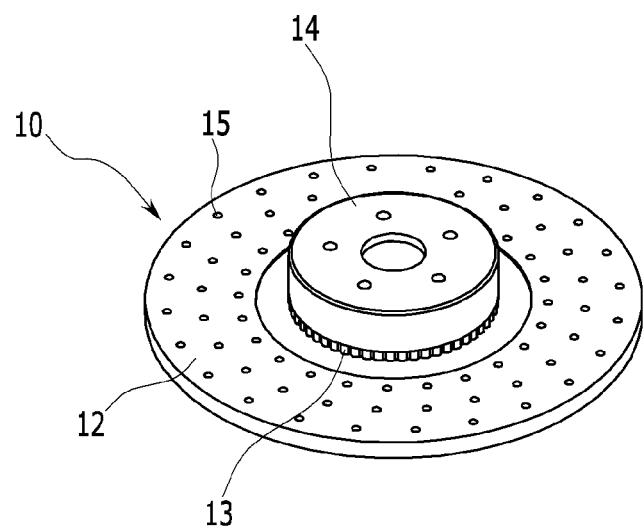
FIG. 6 is a diagram illustrating another brake disk manufactured according to the exemplary embodiment of the present invention.

FIGS. 5 and 6 illustrate the brake disks manufactured according to the present exemplary embodiments.

FIG. 5 illustrates the brake disk having a structure in which cooling holes are not formed on a surface of the disk plate 12, and FIG. 6 illustrates the brake disk having a structure in which cooling holes 15 are uniformly arranged on a surface of the disk plate 12.

The brake disks of FIGS. 5 and 6 have the same configurations, except for the existence of the cooling holes, so that the brake disk of the exemplary embodiment illustrated in FIG. 5 will be described as an example, and a description of the exemplary embodiment of FIG. 6 will be omitted below.

The brake disk 10 of the present exemplary embodiment includes a disk plate 12 which provides a friction surface and is formed with a hole 13 at a center thereof, and a hub 14 coupled to the hole 13 formed at the center of the disk plate 12, and the hub 14 is manufactured according to the foregoing manufacturing method of each exemplary embodiment and is bonded to the hole of the disk plate by the interference fit.

The center portion of the hub 14 protrudes to the outside of the disk plate through the hole 13, and an outer peripheral surface of the protruding center portion, that is, the bonded surface of the hub that is in contact with the hole, is bonded to the hole by hot stamping, cold stamping, or hydroforming. The disk plate and the hub are bonded by hot stamping, cold stamping, or hydroforming, so that a separate apparatus, such as a rivet or a bolt, for bonding is not provided.

Further, the bonded surface between the hole 13 of the disk plate 12 and the hub 14 has the form of corresponding unevenness, so that the hole 13 of the disk plate 12 and the hub 14 are bonded while being engaged with each other. Accordingly, it is possible to improve coupling force between the two members. In the present exemplary embodiment, the bonded surface of the hole and the hub has the unevenness form, such as sawteeth, but the unevenness form may have various shapes, other than the sawteeth form.

In the present exemplary embodiment, the disk plate 12 may be formed in a solid type. The disk plate may be divided into a vented type having a structure in which cooling holes are provided between two plate materials, and a solid type formed of a single plate material. The disk plate having the vented structure may improve cooling efficiency, but is manufactured by a cast method, so that it is difficult to manufacture the disk plate with a material having poor castability, and the disk plate having the vented structure is formed of two plate materials, so that there is a disadvantage in that the disk plate is thick and heavy. The disk plate having the solid structure is light and thin to have excellent spatiality, but has deteriorating cooling efficiency to be vulnerable to hot deformation. Accordingly, in the related art, it is difficult to apply the disk plate having the sold structure to a front wheel of a vehicle, and the disk plate having the sold structure is used for a rear wheel.

The disk plate 12 of the present exemplary embodiment is formed of a high-manganese steel material and is manufactured through the hot stamping process, the cold stamping process, or the hydroforming process, so that even though the disk plate 12 is formed in the solid structure, instead of the vented structure, the disk plate 12 has sufficient resistance to hot deformation and exhibits high hardness and wear resistance to be applicable even to a front wheel of a vehicle. Further, the disk plate may be produced by hot forging, and it is easy to secure excellent material properties, such as lightness of the brake disk, improvement of wear resistance, improvement of braking performance.

As a result of a comparison between the brake disk manufactured according to the present exemplary embodiment and a brake disk having the vented structure manufactured by the case method in the related art, the brake disk of the present exemplary embodiment has a thickness of 18 mm and weight of 7 kg, which are decreased from a thickness of 32 mm and weight of 12 kg of the brake disk having the vented structure in the related art in size and weight, thereby achieving lightness.

In addition, the hub is bonded to the disk plate by hot stamping, cold stamping, or hydroforming, so that the hub is not coupled by a separate apparatus, such as a bolt, for fastening, so that weight of the disk plate may be further decreased. The brake disk of the present exemplary embodiment uses high-manganese steel, so that the brake disk has excellent braking performance and wear resistance despite of light weight, and it is possible to maximize productivity through a coupling structure by hot stamping, cold stamping, or hydroforming. Further, the hub that is the general structure steel material also sufficiently secure hardness through hot stamping, cold stamping, or hydroforming, thereby improving hardness of the entire brake disk.

FIG. 7 is a graph illustrating a result of an experiment for braking performance of the brake disk manufactured according to the present exemplary embodiment.

In FIG. 7, the Example is a brake disk in the solid type manufactured of high-manganese steel through the hot stamping process, the cold stamping process, or the hydro-forming process according to the present exemplary embodiment as described above, and the Comparative Example is a gray cast iron brake disk generally produced according to the related art.

The comparison experiment for the Example and the Comparative Example was performed according to the JSAE JASO C406 standard test.

As a result of the experiment, as illustrated in (a) of FIG. 7, it can be seen that at the same braking performance, brake pressure of the Example is lower than that of the Comparative Example, and as illustrated in (b) of FIG. 7, it can be seen that the Example has a larger coefficient of friction than that of the Comparative Example, so that the Example has more excellent braking performance than that of the Comparative Example.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A method of manufacturing a brake disk including a disk plate and a hub, the disk plate providing a friction surface and having a hole formed at a center thereof, and the hub being coupled to the hole, the method comprising:

preparing a disk plate;

preparing a hub; and bonding the hub to the disk plate by an interference fit, wherein the bonding includes: hot stamping the hub to the disk plate, and wherein the hot stamping includes: disposing the disk plate within a molding machine, heating the hub at a high temperature, positioning the heated hub in the disk plate, pressurizing and molding the hub so that the hub is bonded to a hole of the disk plate to bond the hub to the disk plate by the interference fit, and quenching the hub.

2. The method of claim 1, wherein:

the high temperature is a temperature of 900° C. to 950° C.

3. The method of claim 2, wherein:

the pressurizing and molding includes: applying a pressure of 12 to 22 KN/cm$^2$ to the hub.

4. The method of claim 1, wherein:

the preparing of the disk plate further includes: processing the hole in the form of an unevenness at a center of the disk plate.

5. The method of claim 1, wherein:

the preparing of the hub further includes: processing a bonded portion of the hub that is in contact with an inner peripheral surface of the hole to have a form corresponding to the hole of the disk plate.

* * * * *